Patented Jan. 16, 1940

2,187,185

UNITED STATES PATENT OFFICE

2,187,185

NEW PLASTIC MATERIAL

Julius Söll, Leverkusen-I. G. Werk, Germany, assignor to I. G. Farbenindustrie Aktiengesellschaft, Frankfort-on-the-Main, Germany No Drawing. Application January 27, 1933, Serial No. 653,921. Renewed December 14, 1935. In Germany February 9, 1932

14 Claims. (Cl. 260—771)

The present invention relates to a process of treating rubber with hydrofluoric acid and to the new plastic materials obtainable by said process.

According to the invention unvulcanized or vulcanized rubber is caused to be reacted upon by hydrofluoric acid of any desired concentration above about 40% by weight. The reaction may be performed while applying the hydrofluoric acid either in the gaseous or liquid state or dissolved in water or another suitable solvent, which is not substantially attacked by the hydrofluoric acid.

The temperature at which reaction takes place varies within the widest limits. Temperatures of 0° C. or even less are generally operable, but higher temperatures are preferred since they accelerate the reaction. They should especially be applied in all those cases in which a rather weak hydrofluoric acid is used. Preferred temperature ranges are generally those between about 15 and about 120° C. Preferred ranges of the concentration of the hydrofluoric acid are those between about 50 and about 85% by weight. Higher temperatures as mentioned above are likewise operable but unnecessary and inconvenient, since they involve the use of superatmospheric pressure.

Also the time during which the reaction should be continued varies within the widest limits, depending on the strength of the hydrofluoric acid applied as well as on the temperature and the type of rubber used. Such, for example, a sheet of raw rubber immersed into aqueous hydrofluoric acid of 66% strength at a temperature of about 60–70° C. for 24 hours yielded a reaction product of a softening point of about 110° C. whereas, when applying an aqueous hydrofluoric acid of 57% and a temperature of 80–90° C. about 48 hours will be necessary to yield a product of similar properties. It may be mentioned that the softening point of the new plastic materials is higher than that of natural rubber and can be taken as a test as to how far the reaction has proceeded. For example, reaction products having been obtained under mild conditions of working may have a softening point of about 90° C. or even less, whereas the treatment under stronger conditions may yield reaction products of a softening point of about 160° C. or even more. Applicant is not exactly aware how the hydrofluoric acid reacts with the rubber. The primary reaction products always contain hydrofluoric acid up to about 30% by weight or more. However, when exposing the same to air or when heating the same, they lose hydrofluoric acid to a substantial degree. In this manner applicant has obtained products which, after prolonged storage, only contained about 2% by weight of hydrofluoric acid, and he does not know, whether this hydrofluoric acid has chemically combined with the rubber or is retained in form of a solution in the rubber. At any event according to applicant's process there are obtained new plastic masses resembling leather or horn. They are difficultly soluble or insoluble in the usual rubber solving solvents. When heating the new plastics they become soft and can be pressed into any desired shape. Therefore, they are suitable for the manufacture of molded articles of any desired kind.

The term "rubber" as used herein and in the claims is intended to embrace all the various varieties of natural rubber and their corresponding vulcanization products (soft rubber and hard rubber).

The following examples illustrate the invention, without, however, limiting it thereto:

*Example 1.*—Aqueous hydrofluoric acid of 60% strength is brought into a lead vessel provided with a reflux condenser. Pieces of smoked sheets or another rubber material are placed into the gas room above the hydrofluoric acid. The latter is then heated up to the boiling point. After some hours the rubber has changed to a leather- or horn-like product, depending on the temperature applied and on the duration of heating.

*Example 2.*—Aqueous hydrofluoric acid of 60–90% strength is placed into a closed vessel. Into another vessel pieces of unvulcanized or vulcanized rubber are placed. Air or another gas being inert to hydrofluoric acid is then pumped in a circuit through the hydrofluoric acid and the vessel containing the rubber. The latter vessel is advantageously heated, for example, to 40–100° C. in order to accelerate the reaction. Leather- or horn-like reaction products are obtained.

*Example 3.*—Various samples of unvulcanized or vulcanized rubber are heated in aqueous hydrofluoric acid. Leather- or horn-like products possessing the following softening points are obtained:

| Rubber | Temperature | Strength of the hydrofluoric acid | Duration of treatment | Softening point of the reaction products |
|---|---|---|---|---|
|  | °C. | Percent by weight | Hours | °C. |
| Smoked sheets | 25 | 69 | 48 | 90 |
| Soft rubber plate (vulcanized) 2 mm. thickness | 80–90 | 57 | 48 | 105–110 |
| Smoked sheets | 80–90 | 57 | 48 | 105–110 |
| Do | 15 | 76 | 20 | 120 |
| Soft rubber plate (vulcanized) 2 mm. thickness | 35 | 75 | 48 | 140 |
| Smoked sheets | 15 | 85 | 6 | 155 |

I claim:
1. The process which comprises reacting upon rubber with hydrofluoric acid of a strength above about 40% by weight.

2. The process which comprises reacting upon rubber with hydrofluoric acid of a strength above about 40% by weight at a temperature between about 15 and about 120° C.

3. The process which comprises reacting upon rubber with hydrofluoric acid of a strength between about 50 and about 85% by weight.

4. The process which comprises reacting upon rubber with hydrofluoric acid of a strength between about 50 and about 85% by weight at a temperature between about 15 and about 120° C.

5. Plastic materials obtained according to the process claimed in claim 1, said materials being of leather- or horn-like character and having a softening point above that of rubber.

6. Plastic materials obtained according to the process claimed in claim 2, said materials being of leather- or horn-like character and having a softening point above that of rubber.

7. Plastic materials obtained according to the process claimed in claim 3, said materials being of leather- or horn-like character and having a softening point above that of rubber.

8. Plastic materials obtained according to the process claimed in claim 4, said materials being of leather- or horn-like character and having a softening point above that of rubber.

9. Thermoplastic rubber materials which are practically insoluble in organic rubber solvents and have softening points between about 90 and about 160° C., and are obtainable by reacting upon rubber with hydrofluoric acid of a strength above about 40% strength by weight.

10. Thermoplastic rubber materials which are practically insoluble in organic rubber solvents and have softening points between about 90 and about 120° C., and are obtainable by reacting upon rubber with hydrofluoric acid of a strength above about 40% strength by weight.

11. The process which comprises treating solid rubber with hydrogen fluoride.

12. The process which comprises treating solid rubber with substantially anhydrous hydrogen fluoride.

13. A product resulting from the treatment of solid rubber with substantially anhydrous hydrogen fluoride.

14. The process which comprises exposing solid rubber to substantially anhydrous hydrogen fluoride until the surface at least of the rubber is converted to a product harder than the original rubber.

JULIUS SÖLL.